United States Patent
Paare et al.

(10) Patent No.: US 8,414,041 B2
(45) Date of Patent: Apr. 9, 2013

(54) AUTOMOBILE BUMPER ARRANGEMENT AND MODULAR BUMPER SYSTEM

(75) Inventors: Mirko Paare, Paderborn (DE); Dariusz Straznikiewicz, Paderborn (DE); Oliver Müller, Paderborn (DE); Enrico Seidl, Neukirchen (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/085,038

(22) Filed: Apr. 12, 2011

(65) Prior Publication Data

US 2012/0091742 A1      Apr. 19, 2012

(30) Foreign Application Priority Data

Apr. 14, 2010   (DE) .................. 10 2010 014 999

(51) Int. Cl.
 *B60R 19/24*          (2006.01)
(52) U.S. Cl. .... 293/154; 293/132; 293/133; 296/187.09
(58) Field of Classification Search .................. 293/132, 293/133, 149, 154, 155; 296/29, 187.03, 296/187.09, 187.1, 203.01
See application file for complete search history.

(56) References Cited

U.S. PATENT DOCUMENTS

| | | | |
|---|---|---|---|
| 3,820,834 A | 6/1974 | Wilfert et al. | |
| 6,174,009 B1 * | 1/2001 | McKeon | 293/133 |
| 6,299,226 B1 * | 10/2001 | Kroning et al. | 293/120 |
| 6,695,368 B1 * | 2/2004 | Weykamp et al. | 293/154 |
| 7,188,877 B2 | 3/2007 | Gonzales et al. | |
| 7,210,719 B2 * | 5/2007 | Honda et al. | 293/155 |
| 7,422,252 B2 | 9/2008 | Gouillart et al. | |
| 2005/0156443 A1 * | 7/2005 | Suzuki et al. | 293/154 |
| 2006/0249962 A1 | 11/2006 | Gonzalez et al. | |
| 2007/0210590 A1 | 9/2007 | Gouillart et al. | |
| 2008/0012386 A1 * | 1/2008 | Kano et al. | 296/187.03 |
| 2008/0224487 A1 | 9/2008 | Wang et al. | |
| 2009/0045638 A1 | 2/2009 | Handing et al. | |
| 2009/0160204 A1 * | 6/2009 | Czopek et al. | 293/133 |

FOREIGN PATENT DOCUMENTS

| | | |
|---|---|---|
| DE | 197 44 274 A1 | 4/1999 |
| DE | 102004008740 | 6/2005 |
| DE | 102004046585 | 4/2006 |
| EP | 0 894 675 A1 | 2/1999 |
| JP | 11048883 A | 2/1999 |
| JP | 2000062551 A | 2/2000 |

* cited by examiner

*Primary Examiner* — Glenn Dayoan
*Assistant Examiner* — Jason S Daniels
(74) *Attorney, Agent, or Firm* — Henry M Feiereisen

(57) ABSTRACT

An automobile bumper arrangement includes a crossbeam coupled to side rails of an automobile via crash boxes, wherein the crossbeam has extensions disposed at end sections which are laterally supported on a corresponding crash box. A modular bumper system has a crossbeam, an extension and a crash box coupled to a side rail of an automobile, wherein the crossbeam has a standardized length and a vehicle-specific width of a bumper can be attained by varying the length of the extension.

10 Claims, 1 Drawing Sheet

AUTOMOBILE BUMPER ARRANGEMENT AND MODULAR BUMPER SYSTEM

CROSS-REFERENCES TO RELATED APPLICATIONS

This application claims the priority of German Patent Application, Serial No. 10 2010 014 999.3-21, filed Apr. 14, 2010, pursuant to 35 U.S.C. 119(a)-(d), the content of which is incorporated herein by reference in its entirety as if fully set forth herein.

BACKGROUND OF THE INVENTION

The present invention relates to an automobile bumper arrangement a modular bumper system for an automobile.

The following discussion of related art is provided to assist the reader in understanding the advantages of the invention, and is not to be construed as an admission that this related art is prior art to this invention.

Bumper systems of automobiles have particular importance in view of current legal requirements in the area of low-speed tests and high-speed tests, because the design of a bumper system has a direct impact on the type of damage and the monetary amount of damages of an automobile.

The type of damage and the monetary amount of damages are used for assigning automobiles to specific insurance classifications. The lower the amount of expected damages, the more favorable is the insurance classification for the automobile. A number of different crash repair tests exist. For example, a 10° barrier may be employed, i.e., the vehicle drives onto a barrier with a 10° slope during an offset crash, whereas the vehicle is hit by a ram vehicle during a rear offset crash, with the ram vehicle hitting the vehicle at an angle of 10° relative to the longitudinal vehicle axis. As a result of the design of today's automobiles, the barriers directly hit the bumper support of subsequent crash boxes, whereby the crash boxes absorb in these crash repair tests the major part of the energy, i.e., approximately the entire energy.

In addition, tests can also be performed with a barrier overlap of only 15% with the axle width or the width of the vehicle. The so-called bumper-to-bumper tests place completely different demands on the properties of the bumper crossbeam.

Typically, bumper crossbeams are slightly curved, whereby their end sections which protrude over the side rails or crash boxes may have a greater curvature. This has particular reasons dictated by the vehicle body, which is determined by the appearance and the aerodynamics of the skirt arranged above the bumper system.

When the degree of overlap with a barrier is very low, for example during the bumper-to-bumper test, the barrier used in a crash test may slide of the curved end section of the bumper crossbeam or the automobile may slides along the barrier, which may cause significant damage to the fender area. This type of damage will result in a lower insurance classification.

Today's shape of automobiles, in particular of passenger vehicles, with rounded corner regions on the crossbeams leaves very little flexibility for the design of the bumper crossbeam, whereby the curved end sections can not be eliminated, because they are necessary for transferring the impact energy to the crash boxes and the side rail, respectively. The corner regions are also of particular importance in the event of potential side impact crashes in order to minimize the type of damage.

It would therefore be desirable and advantageous to obviate prior art shortcomings and to provide an improved bumper arrangement which can be adapted for different types of vehicles and which further improves the response in a crash.

SUMMARY OF THE INVENTION

According to one aspect of the present invention, an automobile bumper arrangement includes crash boxes coupled to side rails of an automobile, and a crossbeam having end sections. Each end section has a corresponding extension laterally supported on a corresponding crash box. Each end section furthermore has a first segment and a second segment, wherein the first segment and the second segment are arranged with a V-shape relative to one another.

According to an advantageous feature of the present invention, the extensions may hereby be affixed to the crossbeam by various coupling methods. The coupling methods may include material connections, frictional connections and/or force-locked connections.

According to an advantageous feature of the present invention, the extension in the present invention may laterally supported on the crash box. This structure where the crash box is laterally supported better absorbs the forces generated in the event of a lateral crash. This structure also improves absorption and/or transfer of forces from the extension of the bumper arrangement to the remaining body of the automobile in the event of an offset crash, a bumper-to-bumper crash as well as a side crash.

According to an advantageous feature of the present invention, the extension may be made from a steel material. This may be a cold-formed or a hot-formed steel material. In particular, the material is a high-strength material with a yield strength exceeding 700 N/mm$^2$. In the context of the present invention, the extension may also be produced from a different material, for example from a lightweight metal and/or from plastic or a composite material.

According to an advantageous feature of the present invention, the entire automobile bumper arrangement has a width of 1 to 1.8 m, in particular a width of 1.2 to 1.6 m. In the context of the invention, the crossbeam may have a material thickness of 1 to 3 mm, whereas the support has in relation hereto a material thickness of 0.5 to 2 mm, in particular a material thickness of 1.2 to 1.8 mm. The material thickness may also vary along the crossbeam or along the extension.

In the Y-direction of the automobile, the extension may have a width from 5 to 70 cm, in particular from 15 to 60 cm; a particularly preferred width ranges from 20 to 50 cm.

According to an advantageous feature of the present invention, the lateral support of the extension may be supported by the crash box alone, by their flange plate alone, or by a combination thereof, i.e., by both the flange plate and the crash box. In the context of the invention, the flange plate may be arranged between the crash box and potential attachment points on the automobile, in particular the side rails. In the context of the invention, the crash box may be already formed with a flange plate; alternatively, the crash box may be coupled with the flange plate.

According to an advantageous feature of the present invention, the extension may be a profile component, for example a profile component with a C-shaped cross-section. When the automobile bumper arrangement is constructed in several parts, the extension may be optimally adapted to the respective crash requirements of both offset crashes and side crashes. In addition, the fields of application are thereby optimized, while at the same time the weight and the unit costs and tool costs are significantly reduced. Accordingly, an automobile can be produced using identical parts, wherein an automobile bumper arrangement can be produced particularly cost-effectively while simultaneously improving the crash response.

According to an advantageous feature of the present invention, the extension is a component produced by forming. The component may be a sheet-metal component produced with different forming processes. For example, the sheet-metal component may be produced by rolling, by hot-rolling followed by press-hardening, or with other similar forming processes. A particularly high rigidity in the side region may be attained by annealing and/or hardening the extension. With the multi-component construction of the automobile bumper arrangement, the crossbeam may then attain a high energy absorption capacity which may be the result of, for example, an average rigidity and plastic deformation work in cooperation with the crash boxes, while simultaneously providing high lateral rigidity in cooperation with the extensions. This is particularly advantageous in a frontal crash, for example, when the center of the automobile hits a tree, in cooperation with an offset crash, when the laterally impacting object should advantageously be deflected from the vehicle.

According to an advantageous feature of the present invention, the extension of a crash box may be supported with a fork-shaped seat. With the lateral support of the crash box, the automobile bumper arrangement attains greater rigidity in the event of a lateral impact. Conversely, in a frontal crash, the lateral support prevents a deformation of the crash box only slightly. The fork-shaped seat almost entirely eliminates unintentional movement of the system. The fork-shaped seat hence provides a guiding effect for the automobile bumper arrangement in a vehicle crash.

According to an advantageous feature of the present invention, the extension may be coupled to the crash box. The lateral support then advantageously increases the rigidity in a side crash for particular requirements. This increase is caused by the fixed position of the support on the crash box. The coupling may here be achieved with a material connection, a non-positive connection, a positive connection or in other ways. In the context of the invention, the coupling may have, for example, predetermined breaking points in the event of a vehicle crash. The coupling then advantageously breaks in a frontal crash, so that the fold properties of the crash box are not limited, whereas the coupling contributes to an increase in the side crash rigidity in a side crash.

According to an advantageous feature of the present invention, the extension may have a first segment and a second segment, wherein the first segment and the second segment may be arranged with a V-shape relative to one another. In the context of the invention, the first segment may be constructed to match the shape of the crossbeam. In other words, the first segment may be an extension of the crossbeam. The second segment may be arranged in relation to the first segment essentially with a V-shape. I.e., an acute angle may be formed between the first and the second segment. This angle may be, for example, in a range from 1° to 50°. If the extension is a sheet-metal component produced by forming, then the first and the second segment may be connected, within the context of the invention, so as to form a single piece, whereby the essentially V-shaped extension is produced by folding over an extension blank.

According to an advantageous feature of the present invention, the extension may have recesses disposed on a top side and a bottom side of an outside end. The recesses of the one-piece sheet-metal component, which has in cross-section a profile configuration, preferably a C-shaped configuration, are provided to simplify the forming process in the production of the substantially V-shaped sheet-metal component. In the context of the invention, the first and second segment may conceivably again be joined by coupling in superpositioned or overlapping regions. The coupling may be produced, for example, in form of a spot weld or with other coupling methods.

According to an advantageous feature of the present invention, the automobile bumper arrangement may be designed as a modular system for adaptation to different vehicles by varying the length of the extension and the length of the crash box. In the context of the invention, due to the multi-part construction of the automobile bumper arrangement, the automobile bumper arrangement can advantageously be used with vehicle types of different classes and styles.

For example, the automobile bumper arrangement according to the invention may be adapted to automobiles of the compact class by making the extensions short. Conversely, when the automobile bumper arrangement is adapted to, for example, commercial vehicles or vehicles of the luxury class, the extensions may be long compared to the compact class, so that an automobile bumper arrangement with the same basic configuration can here be used. In the context of the invention, different angles for supporting the extensions can be implemented with crash boxes of different lengths. This can have particular advantages for the crash properties of the vehicle depending on the application and other requirements.

According to another aspect of the invention, a modular bumper system includes a crossbeam having a standardized length independent of a vehicle width, an extension having a variable length, and a crash box having a variable length, wherein the crash box is connected between a side rail of a vehicle and a corresponding extension. A bumper having a vehicle-specific width is constructed from a crash box having a first length and an extension having a second length, with the first length selected depending on the second length.

In this way, the modular bumper system can advantageously be adapted to vehicles of different classes, meaning vehicles having different vehicle widths and different vehicle crash requirements. Advantageously, this approach is cost-effective because a standardized crossbeam can be used. A standardized crossbeam in the context of the invention is meant to indicate a crossbeam which has always the same length across the width of the vehicle. Depending on the vehicle type, extensions which are tailored to the requirements and the available installation space of the automobile are coupled to this crossbeam. The production process of such crossbeam therefore creates a modular bumper system with a particularly advantageous and cost-effective bumper.

According to an advantageous feature of the present invention, crash boxes of different lengths may be employed, depending on the length of the extension. Crash boxes having different lengths may respond differently to the crash characteristics demanded from the automobile. An angle of an extension can be defined commensurate with a respective required side crash characteristics which results from the arrangement of the support of the extension relative to the crash box. The angle of the support of the extension may also be related to the automobile itself depending on specific vehicle requirements. The crash energy may then be absorbed in the lateral areas specific for the automobile. For example, this relates offset crashes as well as side crashes of the vehicle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
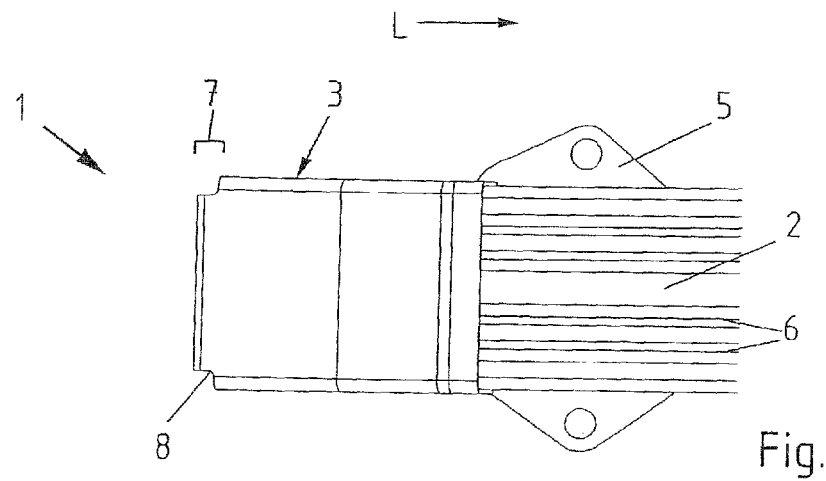
FIG. 1 shows an automobile bumper arrangement according to the invention in a frontal view.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an automobile bumper arrangement 1 according to the invention in a frontal view. The automobile bumper arrangement 1 has a crossbeam 2, an extension 3 coupled to the crossbeam 2, as well as an unillustrated crash box 4 and a flange plate 5 coupled to the crash box 4. The flange plate 5 is used to attach the automobile bumper arrangement 1 to an unillustrated automobile, for example to the side rails of the automobile.

The crossbeam 2 illustrated in FIG. 1 has different stiffening corrugations 6 extending over its length L for increasing the rigidity. The end 7 of the extension 3 coupled to the crossbeam has recesses 8. These recesses can be used, for example, in the production of a one-piece sheet-metal component by forming.

Figure 2:
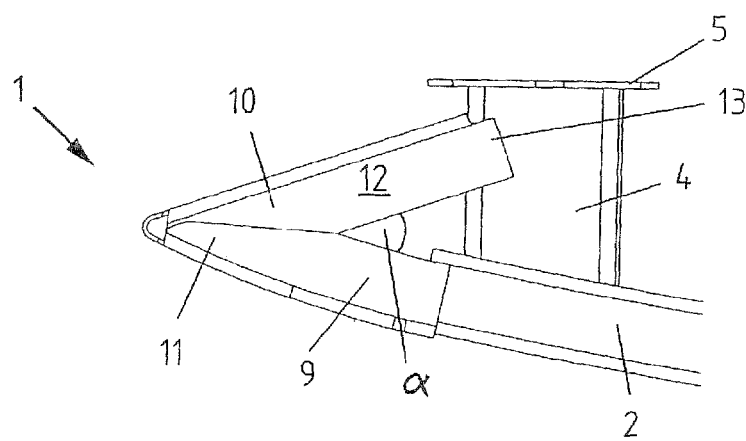
FIG. 2 shows an automobile bumper arrangement according to the invention in a top view.

FIG. 2 shows the automobile bumper arrangement 1 in a top view. Illustrated are again the crossbeam 2, the extension 3, the flange plate 5 and the crash box 4. The extension 3 is here divided into a first segment 9 and a second segment 10. The first segment 9 and the second segment 10 are arranged essentially in a V-shape with respect to one another. The first segment 9 and the second segment 10 form an angle a therebetween.

In addition, the first segment 9 and the second segment 10 overlap in an overlap region 11. The extension 3 can be internally stiffened, for example, by additional coupling. Spot welding may be envisioned. As can also be seen, the recesses 8 disposed on the end 7 of the extension 3 offer advantages for the forming process. The extension 3 is arranged in with the second segment 10 upon the crash box 4.

For seating on the crash box 4, an illustrated fork-shape head 13 is arranged on an end 12 of the second segment 10, producing a form-fitting connection between the crash box 4 and the extension 3 in the region of the support. The crash box 4 and the extension 3 may be additionally connected to one another with an additional coupling.

Figure 3:
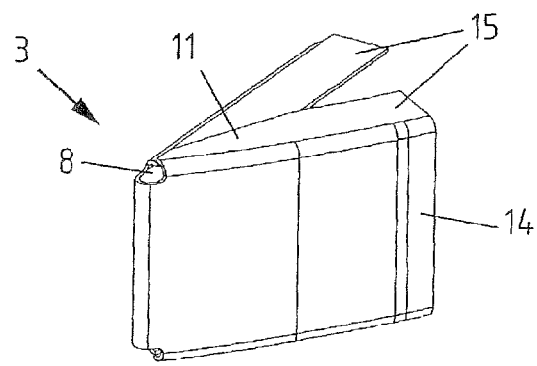
FIG. 3 shows an extension according to the invention.

FIG. 3 shows the extension in a perspective top view. As can be seen, the extension 3 is produced substantially from a profile having a C-shaped configuration in cross-section. The profile has a crown 14 and lateral legs 15. The legs 15 are arranged on top of one another in the overlap region 11. The rigidity of the extension 3 can thereby be increased by way of additional coupling. In the context of the invention, the opposing legs 15 of the first segment 9 and the second segment 10 may also be butt-coupled at the respective ends.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An automobile bumper arrangement, comprising:
   a crash box coupled to a side rail of an automobile, and
   a crossbeam having an end section provided with an extension laterally supported on the crash box, said extension comprising a first segment and a second segment which are arranged with a V-shape relative to one another, with one of the first and second segments having an end provided with a fork-shaped seat for form-fitting connection with the crash box.

2. The automobile bumper arrangement of claim 1, wherein the extension is a profile component.

3. The automobile bumper arrangement of claim 2, wherein the extension has a C-shaped cross-section.

4. The automobile bumper arrangement of claim 1, wherein the extension is a component produced by forming.

5. The automobile bumper arrangement of claim 1, wherein the extension is coupled to the crash box.

6. The automobile bumper arrangement of claim 1, wherein an outside end of the extension has recesses disposed on a top side and a bottom side of the outside end.

7. The automobile bumper arrangement of claim 1, wherein the automobile bumper arrangement forms a modular system, with a length of the extension and a length of the crash box being variable for adaptation to different vehicles.

8. A modular bumper system, comprising:
   a crossbeam having a standardized length independent of a vehicle width,
   a plurality of extensions having variable lengths and selectively connectable to the crossbeam, each of the extensions having a first segment for attachment to the crossbeam and a second segment extending at an angle to the first segment and having an end provided with a fork-shaped seat, and
   a plurality of crash boxes having variable lengths and selectively connectable to the fork-shaped seat of a selected one of the extensions in a formfitting manner,
   wherein the selected one of the crash boxes is selected in dependence on the length of the selected one of the extensions so as to match a vehicle specific width of a bumper.

9. The modular bumper system of claim 8, wherein the crossbeam comprises end sections, with each end section having a corresponding extension laterally supported on a corresponding crash box and comprising a first segment and a second segment, wherein the first segment and the second segment are arranged with a V-shape relative to one another.

10. The automobile bumper arrangement of claim 1, wherein the other one of the first and second segments extends in prolongation of the crossbeam.

\* \* \* \* \*

UNITED STATES PATENT AND TRADEMARK OFFICE
CERTIFICATE OF CORRECTION

PATENT NO. : 8,414,041 B2  
APPLICATION NO. : 13/085038  
DATED : April 9, 2013  
INVENTOR(S) : Mirko Paare et al.

Page 1 of 1

It is certified that error appears in the above-identified patent and that said Letters Patent is hereby corrected as shown below:

In the Specification

Column 5, line 44 change "angle a" to --angle α--  
Column 5, line 50 change "arranged in with" to --arranged with--

Signed and Sealed this  
Seventeenth Day of September, 2013

Teresa Stanek Rea  
*Deputy Director of the United StatesPatent and Trademark Office*